United States Patent [19]

Gueguin

[11] 4,325,920

[45] Apr. 20, 1982

[54] METHOD TO OXIDIZE TI$^{+3}$ DURING THE SULFURIC ACID DIGESTION OF TITANIFEROUS SLAGS

[75] Inventor: Michel Gueguin, Tracy, Canada

[73] Assignee: QIT-Fer et Titane du Quebec, Inc., Canada

[21] Appl. No.: 206,300

[22] Filed: Nov. 12, 1980

[51] Int. Cl.$^3$ .............................................. C01G 23/00
[52] U.S. Cl. ........................................ 423/82; 75/1 T
[58] Field of Search ............... 423/69, 82, 83; 75/1 T

[56] References Cited

U.S. PATENT DOCUMENTS

| | | | |
|---|---|---|---|
| 2,066,093 | 12/1936 | Cauvenberg | 423/82 |
| 2,589,909 | 3/1952 | Weikel . | |
| 2,589,910 | 3/1952 | Schneider . | |
| 2,631,924 | 3/1953 | McKinney | 423/86 |
| 2,715,501 | 8/1955 | Magri, Jr. et al. . | |
| 2,850,357 | 9/1958 | Myers et al. . | |
| 2,953,434 | 9/1960 | McKinney et al. . | |
| 2,980,250 | 4/1961 | Beckers . | |
| 2,980,508 | 4/1961 | Moklebust et al. | 423/82 |
| 3,868,441 | 2/1975 | Agee et al. | 423/82 |
| 4,117,076 | 9/1978 | Gueguin . | |

FOREIGN PATENT DOCUMENTS

| | | | |
|---|---|---|---|
| 673236 | 10/1963 | Canada | 423/82 |
| 1129654 | 1/1957 | France | 423/82 |

OTHER PUBLICATIONS

Encyclopedia of Chemical Technology, vol. 12, pp. 361–381.

*Primary Examiner*—Herbert T. Carter
*Attorney, Agent, or Firm*—John L. Sniado; Anthony M. Lorusso

[57] ABSTRACT

The invention relates to the sulfuric digestion of titaniferous slags and more specifically to a method to decrease the reduced titanium concentration in the resulting sulfate liquor. The process uses lignin products to assist in the oxidation of the Ti$^{+3}$ content of the slag.

8 Claims, No Drawings

METHOD TO OXIDIZE TI$^{+3}$ DURING THE SULFURIC ACID DIGESTION OF TITANIFEROUS SLAGS

BACKGROUND OF THE INVENTION

The digestion of titaniferous materials with sulfuric acid is one of the two processes to produce titanium pigment. The raw materials used in the sulfate process are essentially ilmenite ores and titaniferous slags produced by electric furnace smelting of ilmenite ores. Ilmenite ores are composed principally of iorn oxides (Fe++, Fe+++) and titanium oxide. Pure ilmenite can be represented by the formula $FeTiO_3$. Of course, natural ores do not correspond exactly to this formula. The major sources of ilmenite ores are Allard Lake Ore, Australian beach sands and Richards Bay beach sands.

In the sulfuric acid digestion of ilmenite ores, the ilmenite ($FeTiO_3$) is reacted with sulfuric acid to produce $FeSO_4$, $TiOSO_4$ and $Ti(SO_4)_2$. Most of the $FeSO_4$ is removed as crystals and the liquor is boiled and seeded which precipitates $TiO_2$ and regenerates $H_2SO_4$.

When ilmenite is digested with sulfuric acid, the resulting cake after water leaching yields a liquor containing some ferric sulfate which must be later reduced into ferrous sulfate by reaction with metallic iron. This step is necessary in order to avoid any precipitation of iron oxide and other impurities such as vanadium oxide with the titanium dioxide during the hydrolysis stage.

When titaniferous slag is the raw material for digestion, the sulfate liquor normally contains no ferric sulfate but it contains some reduced titanium. $Ti^{+3}$ is present, generally in concentrations of about 3-6 g/l for a titanium concentration of 220-240 g/l expressed as $TiO_2$. If some ferric ions are present, scrap iron is added to get a reduced solution containing some $Ti^{+3}$ as is the case for treating ilmenite. If $Ti^{+3}$, expressed as $TiO_2$ exceeds 6 g/l, the excess $Ti^{+3}$ has to be oxidized to avoid losses of titanium as $Ti^{+3}$ does not hydrolyse.

Certain ores such as Allard Lake ores (Quebec, Canada) and Richards Bay ore (South Africa) are processed more economically by first smelting the ore with carbon, coal, etc. The process takes place in an electric furnace wherein the ore is liquefied and a substantial part of the iron content thereof is reduced to the molten elementary state. The titaniferous phase floats on this iron and is tapped therefrom into molds, in which it is partly cooled. The products of this process are metallic iron and a slag much richer in $TiO_2$. The slag produced by the foregoing smelting process when Allard Lake ores are treated is called Sorelslag. This slag and similar slags are treated by the sulfate process described above to recover $TiO_2$.

Sorelslag upon digestion normally results in the retention of 3-6 g/l of $Ti^{+3}$ in the sulfate liquor. Slight variations occur from time to time as in all commercial operations and slight adjustments have to be made sometimes either by reduction with scrap iron or oxidation with chemicals. These chemicals might be nitrates, hydrogen peroxide, etc.

As stated above, the $Ti^{+3}$ level of Sorelslag is 3-6 g/l. However, with higher grade ilmenites such as beach sand ilmenite from Richards Bay, a higher $TiO_2$ slag is obtained in the smelting operation along with a much higher reduced titanium content in the slag. Such a slag will digest properly but will consistently yield a sulfate solution after digestion with a higher $Ti^{+3}$ content than the desired (6 g/l). Oxidation with an oxidizing chemical such as sodium nitrate will be required.

Another method to oxidize the excess $Ti^{+3}$ content is to digest a mixture of slag and ilmenite (containing ferric oxide) or ferric oxide (U.S. Pat. No. 2,953,434). Such mixtures yield ferric sulfate by reacting with sulfuric acid. During the dissolution of the cake, $Fe^{+3}$ ions react with $Ti^{+3}$ ions to yield $Fe^{+2}$ and $Ti^{+4}$. It is possible to digest ilmenite and slag separately and later mix the resulting sulfate liquors in the proper proportions. The disadvantage of this method, however, is that it produces more iron sulfate thus aggravating pollution problems.

U.S. Pat. No. 2,990,250 involves the selective preoxidation of the slag, which method requires treating the finely ground slag at carefully controlled temperatures to avoid the conversion of the slag into an insoluble material (U.S. Pat. No. 2,715,501).

U.S. Pat. Nos. 2,589,909 and 2,589,910 suggest the oxidation of $Ti^{+3}$ by aeration during the baking of the sulfate cake. This requires blowing hot air in order to avoid a rapid cooling of the cake.

U.S. Pat. No. 2,850,357 uses a carbonaceous material (coal, coke, carbonized carboxyhydrate) as a catalyst promoting the oxidizing properties of sulfuric acid at high temperature. The disadvantage is that the method needs a very finely divided substance uniformly mixed with the slag which is relatively difficult to realize in commercial operation.

SUMMARY OF THE INVENTION

The present invention used lignins, an inexpensive by-product of the pulp and paper industry, in conjunction with sulfuric acid in the digestion process. The lignins promote the oxidizing properties of sulfuric acid even when added in very small quantities in the acid-slag mixture and allows the conversion of $Ti^{+3}$ into $Ti^{+4}$ during the digestion process.

DESCRIPTION OF THE PREFERRED EMBODIMENT

At the outset the process is described in its broadest overall aspects with a more detailed description following. In its most basic terms the present invention is a process in which a lignin and sulfuric acid are used to treat $TiO_2$ containing slag. The composition of the slag treatable by the present process is as follows:

| | |
|---|---|
| $TiO_2$ | 70-90 |
| $Ti_2O_3$ (as $TiO_2$) | 10-35 |
| Fe (Total) | 5-15 |
| $Al_2O_3$ | 1-6 |
| CaO | 0-3 |
| MgO | 4-6 |
| Mno | 0-2 |
| $SiO_2$ | 1-7 |
| $V_2O_5$ | 0-1 |
| $Cr_2O_3$ | 0-1 |

As used throughout this specification and claims the term lignin is, after cellulose, the principal constituent of the woody structure of higher plants. About one-quarter of dry wood consists of lignin, in part deposited in the xylem cell walls and in part located in the intercellular spaces, where it may constitute as much as 70% of the solid materials present. Its function in nature is to act as a cementing agent to bind the matrix of cellulose fibers together into a rigid woody structure. Since woody plants are so widespread, lignin is second only to cellulose as the most abundant organic chemical product.

Always closely associated with cellulose, a large proportion, if not all, of the lignin is chemically bound to the plant polysaccharides. Its exact chemical structure both in wood and when separated from other wood substances is not yet known. Much is known about the structure of isolated lignins, however. The lignin, isolated from coniferous trees, is thought to be a polymeric substance, resulting from an enzymically induced oxidation (dehydrogenation) of coniferyl alcohol. Several functional groupings, such as hydroxyl, methoxyl, and carbonyl, have been identified in the lignin polymer. There are probably many lignins, the properties and composition of each depending on the source and method of isolation.

The commercial lignin products are by-products of the wood and cellulose industries. The largest source of lignin products is, of course, the paper industry.

The sulfite process for producing pulp can lead to products (lignins) which consist of lignosulfonic acids, or various lignosulfonates. These are commonly referred to in the trade as lignin sulfonic acids, and lignin sulfonates, but the terms lignosulfonic acid and lignosulfonate are used by Chemical Abstracts. Such products are useable in the present invention.

Lignins that can be obtained from the spent liquors of the sulfate and soda processes are known as alkali lignins. They may be designated as sulfate lignins or soda lignins and are also useable in the process of the present invention. Commercial lignin products useable in the present process are set forth in Table I below.

TABLE I

North American Companies Active in Sales of Lignin Products

| Company | Trade name of main lignin product | Source of lignin | Commodity from which lignin is a by-product |
|---|---|---|---|
| Marathon Division of American Can Co. | Marasperse | mixed wood | sulfite pulp |
| Crown Zellerbach Corp. | Orzan | mixed wood | sulfite pulp |
| Kimberly Clark Corp. | Additive A | mixed wood | sulfite pulp |
| Georgia Pacific Corp. | Lignosite | mixed wood | sulfite pulp |
| Consolidated Paper Corp., Ltd. | Stapel | mixed wood | sulfite pulp |
| Ontario Paper Co., Ltd. |  | mixed wood | sulfite pulp |
| Rayonier, Inc. | Raylig | mixed wood | sulfite pulp |
| Rayonier, Inc. | Rayflo | bark | sulfite pulp |
| Lignosol Chemicals, Ltd. | Lignosol | mixed wood | sulfite pulp |
| Roberson Process Co. | Goulac | mixed wood | sulfite pulp |
| International Paper Co. | Binderene | mixed wood | sulfite pulp |
| Pacific Lumber Co. | Palcotan Palconate | redwood bark | lumber |
| Lake States Yeast and Chemical Division, St. Regis Paper Co. | Toranil | mixed wood | sulfite pulp |
| Weyerhaeuser Co. | Weychem Silvacon | bark | lumber, sulfite and sulfate pulp |
| West Virginia Pulp & Paper Co. | Indulin | mixed wood | sulfate pulp |
| Quaker Oats Co. | Furafil | cereal residues | furfural |
| Goetz Bros. | Sansalo | importer |  |
| Arthur C. Trask Co. | Peritan | importer |  |

In general, an amount of lignin equal to about 0.05–0.4% of the weight of acid is used to treat slag in accordance with the present invention. As used throughout this specification and claims all percentages are by weight. Table II shows the proportions of constituents in greater detail.

TABLE II

Effect of Lignosol Additions on RBIT Slag Digestion

| | $Ti^{+3}/Ti_T$ % | Acid Decomposed % | Yield % | Remark |
|---|---|---|---|---|
| Standard 90% Acid | 24.3 | 0.10 | 93.0 | |
| Acid/slag = 1.80 Baking 200° C., 2h | 21.1 | 0.08 | 93.5 | 100 cc/min of air for 2 hrs during dissolution |
| Lignosol in acid | | | | |
| 0.063% | 10.6 | 0.46 | 93.8 | |
| 0.125% | 4.5 | 0.54 | 94.2 | |
| 0.19% | 1.9 | 0.50 | 93.4 | |
| 0.25% | −0.4 | 1.31 | 94.0 | |
| 0.25% | 2.4 | 1.21 | 93.1 | |
| 0.31% | 0.9 | 1.44 | 94.0 | |
| 0.50% | 0.3 | 1.96 | 93.3 | Slower dissolution rate |
| 0.625% | 1.3 | 2.19 | 91.8 | Slower dissolution rate |
| Lignosol in dissolution slurry 0.31% (of acid weight) | 16.1 | 0.04 | 93.5 | 100 cc/min of air for 2 hrs. |
| 0.31% | 13.8 | 0.04 | 92.2 | 55 cc/min of air for 4 hrs lower flow because of foaming |
| No lignosol | 14.6 | 0.12 | 93.2 | 55 cc/min of air for 4 hrs. |

Negative values for $Ti^{+3}$ indicate $Fe^{+3}$ is present.

In general the present invention utilizes the parameters set forth in U.S. Pat. No. 2,850,357 by Meyers et al. entitled "Digestion of Titanium Dioxide Slags", the teachings of which are incorporated herein by reference with the exception that lignin is substituted for the finely divided carbonaceous material of that patent.

The following non-limiting examples will illustrate the practice of the invention.

EXAMPLE 1

200 g of a titaniferous slag of composition as shown in Table I and ground to 99% −325 mesh, was mixed with 220 cc of 90% sulfuric acid (acid:slag ratio 1:1.8) in a pyrex reaction vessel with a 4 neck cap.

TABLE III

| SLAG COMPOSITION IN % | | |
|---|---|---|
| Equivalent $TiO_2$ | $Ti_2O_3$ (as $TiO_2$) | FeO |
| 85.5 | 27.9 | 10.4 |

A stainless steel stirrer with a hollow shaft was inserted in the central neck in a teflon gasket and connected to a small motor to agitate the digestion slurry. A thermocouple was placed in the hollow shaft of the stirrer. The slurry was rapidly preheated to 100° C. with a heating-plate to initiate or set off the reaction. Then a heating mantle was substituted for the hot plate and the mantle temperature controlled to follow the digestor temperature in order to compensate for the heat losses from the vessel. The maximum temperature reached by the reaction was 200° C. accompanied by solidification of the reaction mixture which was indicated by stoppage of the stirrer. This occurs about 15 minutes after initiation of the reaction. The set-up was then dismantled and the reaction kettle placed in an oven at 200° C. After 2 hours baking the vessel was cooled down to room temperature. The cake was broken down, crushed and leached with 800 cc of 10% sulfuric acid solution for 2 hours at 65° C. The slurry was filtered.

The solid residue was washed with dilute sulfuric acid which was added to the liquor, the volume of which was adjusted at one liter.

The $Ti^{+3}$ concentration in the liquor was 37.2 g/l (expressed as $TiO_2$). The digestion yield was 93.1%.

EXAMPLE 2

200 g of the same slag as above has been treated in the same way as in Example 1, except that 0.38 g of a calcium lignosulfite (lignosol) as a 25% aqueous solution was added initially to the acid.

The final sulfate liquor contained 3.1 g/l of $Ti^{+3}$ expressed as $TiO_2$. The digestion yield was 93.48%.

The primary purpose of the present invention is to treat titaniferous slags. However, it is possible to mix up to 20% ilmenite ores with such slag prior to treatment by the present process.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method of reducing the titanous sulfate content and correspondingly increasing the titanic sulfate content of the digestion product produced by the sulfuric acid digestion of titaniferous slags having a substantial content of titanous compounds which comprises digesting said slags with acid in the presence of a lignin product, said lignin product assisting in the oxidation of the $Ti^{+3}$ content of the slag.

2. The method as set forth in claim 1 wherein up to 20% ilmenite ore is added to the titaniferous slag.

3. The method as set forth in claim 2 wherein the lignin product is calcium lignosulfite.

4. The method as set forth in claim 2 wherein the lignin product is used in an amount equal to about 0.05–0.4% of the weight of acid used to treat the slag.

5. The method as set forth in claim 4 wherein the lignin product is calcium lignosulfite.

6. The method as set forth in claim 1 wherein the lignin product is used in an amount equal to about 0.05–0.4% of the weight of acid used to treat the slag.

7. The method as set forth in claim 3 wherein the lignin product is calcium lignosulfite.

8. The method as set forth in claim 1 wherein the lignin product is calcium lignosulfite.

* * * * *